US006415490B1

(12) United States Patent
Caruso et al.

(10) Patent No.: US 6,415,490 B1
(45) Date of Patent: Jul. 9, 2002

(54) PORTABLE POWER TOOL FOR MOUNTING VIA A PRESS FIT A MACHINE PART ONTO A SHAFT

(75) Inventors: James Caruso, Sterling Heights; Dennis Wells Szabo, Oxford; Karl Gunnar Björkman, South Lyon, all of MI (US)

(73) Assignee: Atlas Copco Tools AB, Nacka (SE)

( * ) Notice: Subject to any disclaimer, the term of this patent is extended or adjusted under 35 U.S.C. 154(b) by 0 days.

(21) Appl. No.: 09/809,956

(22) Filed: Mar. 16, 2001

(51) Int. Cl.$^{7}$ .................................................. B23P 19/04

(52) U.S. Cl. ............................ 29/256; 29/282; 29/263; 29/264; 72/114

(58) Field of Search .......................... 29/256, 263, 264, 29/282, 284, 255, 235; 72/114, 391, 453

(56) References Cited

U.S. PATENT DOCUMENTS 3,654,792 A * 4/1972 Mead .......................... 72/114
4,321,814 A * 3/1982 Martin ........................ 72/114
4,368,631 A * 1/1983 Tanikawa .................... 72/114
5,555,613 A * 9/1996 Schimdt ...................... 29/263

* cited by examiner

*Primary Examiner*—Joseph J. Hail, III
*Assistant Examiner*—Daniel Shanley
(74) *Attorney, Agent, or Firm*—Frishauf, Holtz, Goodman & Chick, P.C.

(57) ABSTRACT

A portable power tool for mounting via press fit a machine part, like a pulley (37) onto a shaft (16) by the application of an axial press force on the pulley (37), comprises a housing (17), a reaction spindle (23) with a threaded end portion (34) for engaging a threaded bore (35) in the shaft (16), a push-carrier (44) axially movable by a motion converting device (40,41) rotationally powered by a standard type power wrench (10) via a planetary gearing (24) including a planet wheel carrier (28) connected to the output spindle (15) of the power wrench (10), a sun gear (26) on the reaction spindle (23) and a ring gear (29) connected to the motion converting device (40,41). A reset spring (50) is arranged to exert a biassing force on the motion converting device (40,41) such that the reaction spindle (23) only is rotated as long as the torque resistance on the reaction spindle (23) is below a certain level, whereby an axial displacement of the push-carrier (44) and the pulley (37) is delayed until the reaction spindle (23) is fully engaged and properly anchored relative to the shaft (16).

15 Claims, 2 Drawing Sheets

PORTABLE POWER TOOL FOR MOUNTING VIA A PRESS FIT A MACHINE PART ONTO A SHAFT

The invention relates to an improved portable power tool for pressing a machine part onto a shaft under a press fit between the machine part and the shaft.

In particular, the invention concerns a portable power tool intended for the above purpose and comprising a reaction spindle with a threaded end portion for engagement with a threaded co-axial bore in the shaft, a push-carrier which is axially movable between a rear rest position and a forward end position and which is arranged to apply an axial press force on the machine part, and an activation mechanism for exerting an axial activation force on the push-carrier while moving the latter axially relative to the reaction spindle in the machine part mounting direction.

In a previously known power tool of this type, the activation mechanism for accomplishing the axial press force comprises a hydraulic piston device. This prior art solution is not satisfactory since the tool is dependent on the access of hydraulic power at the actual work site. This is a restricting factor for the use of the tool. Also at work sites where hydraulic power is available the inevitable hoses for communicating hydraulic fluid to and from the tool make the tool awkward to handle.

In order to avoid the above mentioned drawbacks, the invention provides a power tool with a non-hydraulic activation device and with an improved handling and an unrestricted work site location.

A preferred embodiment of the invention is described below in detail with reference to the accompanying drawings.

IN THE DRAWINGS

Figure 1:
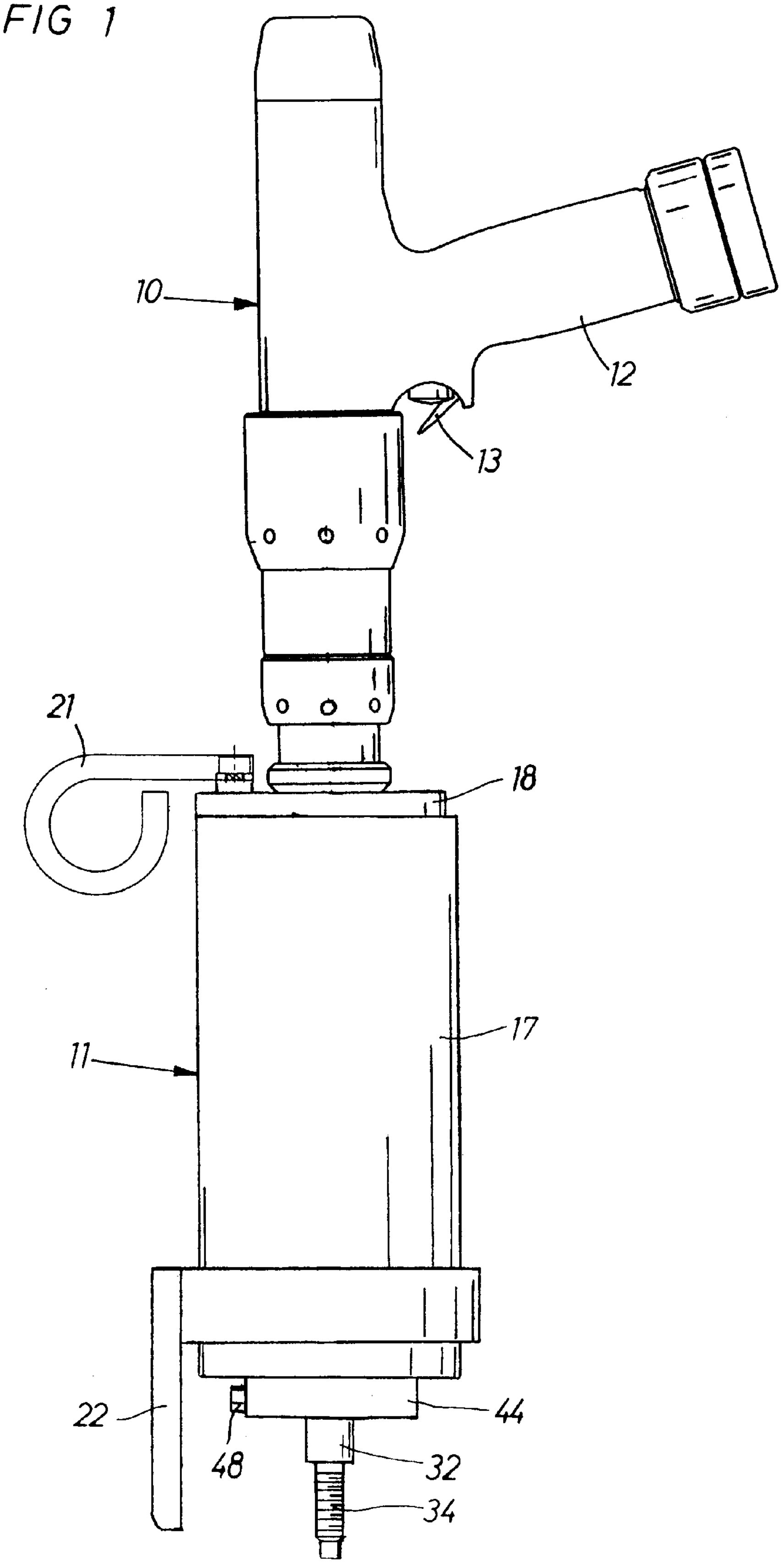
FIG. 1 shows a side elevation of a power tool according to the invention.

The power tool illustrated in FIG. 1 comprises a standard type reversible electric power wrench 10 and an activation mechanism 11 for axially pressing a pulley onto a shaft 16 so as to secure the pulley to the shaft 16 via a press fit. The power wrench 10 comprises a pistol type handle 12 with a power control switch operated by a trigger 13, a nose piece 14 for connection to the activation mechanism 11, and an output shaft 15. See FIG. 2.

The activation mechanism 11 comprises a tube shaped housing 17 with a rear end wall 18 and a forward end wall 19. The housing 17 is provided with a suspension ring 21 for connection to an overhead balancing device (not shown), and a reaction bar 22 extending in parallel with but offset to the longitudinal axis of the activation mechanism 11.

The activation mechanism 11 further comprises a reaction spindle 23 which is coupled to the output shaft 15 of the power wrench 10 via a planetary gearing 24. The planetary gearing 24 comprises a sun gear 26 formed on the reaction spindle 23, planet wheels 27 supported on a planet wheel carrier 28, and a ring gear 29. The planet wheel carrier 28 is connected to the output shaft 15 of the power wrench 10, whereas the planet wheels 27 engage both the sun gear 26 and the ring gear 29.

The reaction spindle 23 consists of two parts, namely a main central portion 31 and a forward separate extension 32 bolted to the main portion 31 by screws 33. The forward extension 32 is provided with a threaded outer end 34 for engaging a threaded co-axial bore 35 in the shaft 16 on which a pulley 37 is to be mounted. The spindle extension 32 is exchangeable for adapting the tool to different types of pulley shafts 16.

The activation mechanism 11 further comprises a motion converting device consisting of a ball screw and nut device 39. This device comprises a rotative activation screw 40 connected to the ring gear 29, a non-rotating nut 41, and a number of balls 42 located in between the screw 40 and the nut 41. The screw 40 is tubular in shape and surrounds the reaction spindle 23, and when rotated it will make the nut 41 perform a rectilinear translation movement. The nut 41 rests axially against a push-carrier 44 which at its forward end is provided with a socket portion 45 for receiving a neck portion 46 of the hub 47 of the pulley 37. Into the socket portion 45 there extends a couple of spring biassed latch devices 48 for engaging a circumferential groove 38 in the pulley hub neck portion 46 and retaining the pulley 37 relative to the push-carrier 44 during the initial stage of the mounting operation.

The activation screw 40 is connected to the ring gear 29 via a splines connection, and a thrust bearing 49 is employed between a ring element 43 on the reaction spindle 23 to transfer axial reaction forces from the activation screw 40 to the reaction spindle 23.

The activation mechanism 11 also comprises a re-set spring 50 which is radially supported on a tubular spring guide 51. At its one end, the spring 50 rests against a shoulder 52 in the housing 17 via a support ring 53, and at its opposite end the spring 50 takes support against a ring element 54 mounted at the rear end of the spring guide 51. The spring guide 51 is rigidly secured to the push-carrier 44 via screws 55.

Figure 2:
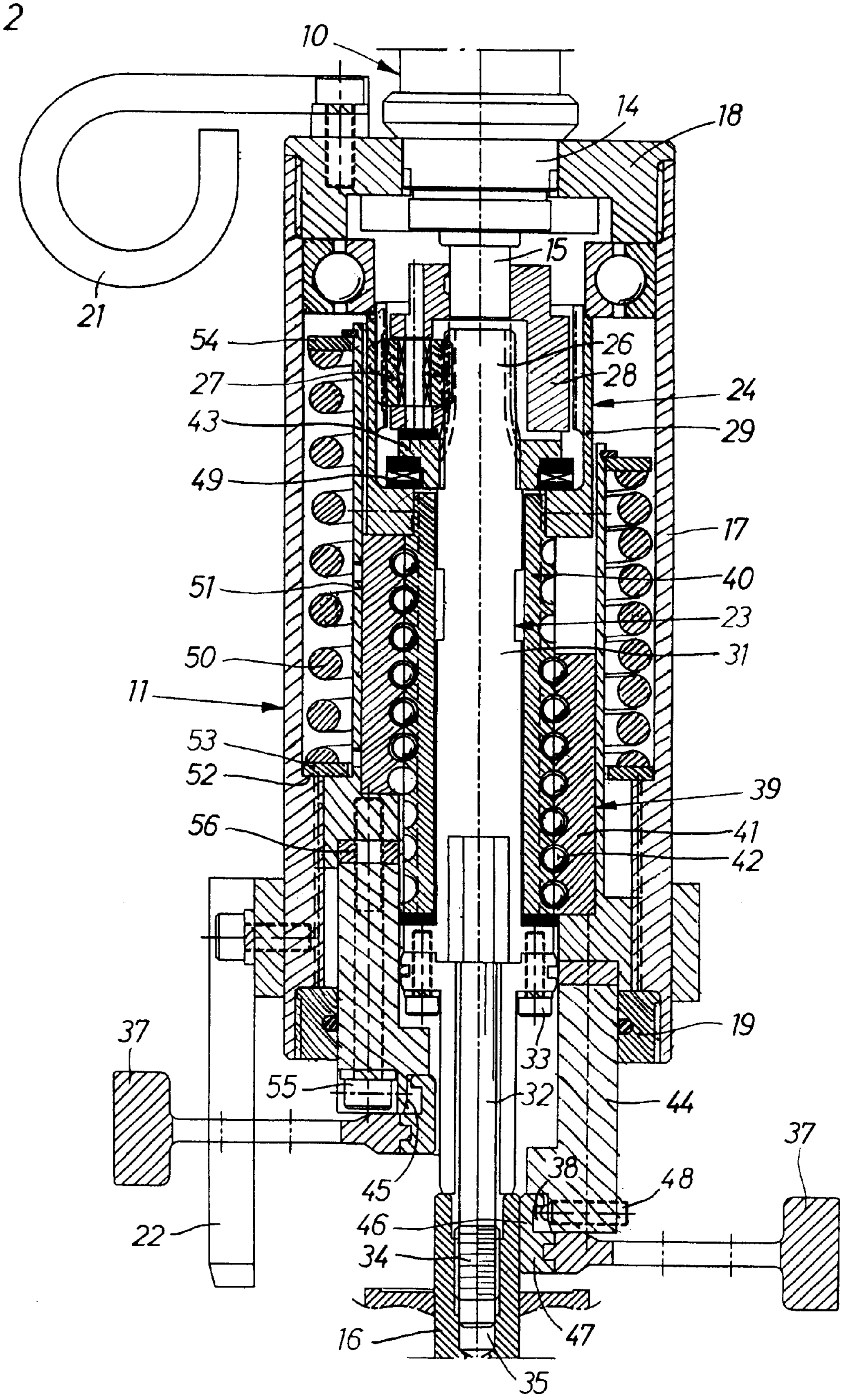
FIG. 2 shows a longitudinal section through a power tool activation mechanism according to the invention.

The push-carrier 44 is displaceable over a stroke range extending between a rear rest position, which is illustrated in the left hand half of FIG. 2, and a forward end position illustrated in the right hand half of FIG. 2. The forward end position is defined by the spring guide 51 abutting against the forward end wall 19 of the housing 17. In the forward end position, the pulley 37 is fully pressed onto the shaft 16.

By a spacer ring 56 of a certain thickness inserted between the spring guide 51 and the push-carrier 44 it is possible to obtain a certain position of the push-carrier stroke range in relation to the reaction spindle 23 and, hence, to the shaft 16. The spacer ring 56 is exchangeable for other space rings of different thickness so as to enable variation of the stroke range position of the push-carrier 44 as desired.

In operation, the nut 41 of the ball-screw device occupies its rearmost position, as illustrated in the left hand half of FIG. 2, and the pulley 37 is attached to the forward end of the activation mechanism 11 with its hub 47 retained by the latch devices 48 in the socket portion 45. Initially, the tool is put in a position where the reaction spindle 23 is located in alignment with the shaft 16. Thereafter, the trigger 13 on the power wrench 10 is pressed to start rotation of the output spindle 15 in the forward direction. As a result, the planet wheel carrier 28 starts rotating, and due to the axial load from the spring 50 acting on the nut 41 via the spring guide 51 there is a resistance against rotation acting on the screw 40 and the ring gear 29. This means that the ring gear 29 remains stationary and the sun gear 26 and the reaction spindle 23 starts rotating.

Now, the threaded end 34 of the reaction spindle extension 32 is brought into engagement with the threaded bore 35 of the shaft 16. During the running down phase of the threaded extension 32 the torque resistance is quite low, and the reaction torque acting on the ring gear 29 is not strong enough to make the screw 40 rotate and axially displace the nut 41 and the push-carrier 44 against the load of spring 50. This means that the nut 41 and the push-carrier 44 remains stationary until the threaded spindle extension 32 has reached the bottom of the bore 35 in the shaft 16. Then, the torque resistance on the reaction spindle 32 increases, and the torque transferred to the ring gear 29 will be strong enough to start rotating the activation screw 40 and displacing the nut 41 and the push-carrier 44 forwards. Now, the hub 47 of the pulley 37 is pressed onto the shaft 16.

In order to protect the operator from the reaction torque developed in the power tool, the reaction bar 22 extends through an opening in the pulley 37 to take support on a suitable structure adjacent the shaft 16. (Not shown).

When the pulley 37 is properly mounted on the shaft 16, however, the rotation direction of the power wrench 10 has to be reversed such that nut 41 and the push-carrier 44 are retracted, and the reaction spindle 31 is disengaged from the threaded shaft bore 35. At the same time, the spring latch devices 48 are automatically released from the pulley hub neck portion 46, and the pulley 37 is left in its mounted position on the shaft 16.

As appears from the above description, the power tool according to the invention provides an automatic shifting from the initial installation of the reaction spindle 23 in the shaft bore 35 to the following press mounting of the pulley 37 onto the shaft 16, which means a simple and fast mounting process. It also means, from the operators point of view, that the entire pulley mounting process is performed in a single stage with a rotation input movement only. The operator just has to press the trigger 13 and keep it pressed until the pulley 37 is properly mounted on the shaft 16. Retracting and resetting the tool, though, requires a shifting to reverse rotation of the power wrench 10 and a second pressing of the trigger 13 to make the reaction spindle 23 disengage from the threaded shaft bore 35.

The power wrench 10 illustrated in the above described example is powered by electricity, but the invention is not restricted to this example. A pneumatic power wrench could be used as well without departing from the scope of the invention as defined in the claims.

What is claimed is:

1. Portable power tool for mounting via a press fit a machine part onto a shaft by application of an axial press force on said machine part, comprising a housing, a reaction spindle with a threaded outer end portion for engagement with a threaded co-axial bore in said shaft, a push-carrier axially movable between a rear rest position and a forward end position and arranged to apply said axial press force on said machine part, and an activation mechanism for accomplishing an axially directed activation force on said push-carrier while moving said push-carrier axially relative to said reaction spindle from said rest position toward said forward end position, wherein said activation mechanism comprises a rotation motor, a power transmission connected to said motor and including a motion converting device for converting the rotation movement of said motor into a linear translation movement, thereby converting the output torque of said motor into said axially directed activation force acting on said push-carrier.

2. Power tool according to claim 1, wherein said activation mechanism comprises a planetary gearing including a sun gear, planet wheels, a planet wheel carrier and a ring gear, said planet wheel carrier is connected to said rotation motor, said sun gear is connected to said reaction spindle, and said ring gear is coupled to said motion converting device.

3. Power tool according to claim 2, wherein said push-carrier is provided with one or more latch devices for retaining the machine part relative to said push-carrier during the initial stage of the mounting process.

4. Power tool according to claim 3, wherein said rotation motor forms a part of a standard type power wrench, and said housing is rigidly connected to said power wrench.

5. Power tool according to claim 2, wherein said rotation motor forms a part of a standard type power wrench, and said housing is rigidly connected to said power wrench.

6. Power tool according to claim 2, wherein said activation mechanism comprises at least one spring which is arranged to be tensioned during forward movement of said push-carrier and to apply a rotation resisting load on said ring gear in said rest position of said push-carrier, thereby making said sun gear and said reaction spindle rotate before said ring gear starts rotating as long as the rotation resisting load on said reaction spindle is below a certain level during inter-engagement of said threaded outer end portion of said reaction spindle and said threaded co-axial bore in said shaft.

7. Power tool according to claim 6, wherein said push-carrier is provided with one or more latch devices for retaining the machine part relative to said push-carrier during the initial stage of the mounting process.

8. Power tool according to claim 7, wherein said rotation motor forms a part of a standard type power wrench, and said housing is rigidly connected to said power wrench.

9. Power tool according to claim 6, wherein said rotation motor forms a part of a standard type power wrench, and said housing is rigidly connected to said power wrench.

10. Power tool according to claim 1, wherein said push-carrier is provided with one or more latch devices for retaining the machine part relative to said push-carrier during the initial stage of the mounting process.

11. Power tool according to claim 10, wherein said rotation motor forms a part of a standard type power wrench, and said housing is rigidly connected to said power wrench.

12. Power tool according to claim 1, wherein said housing is provided with a laterally offset torque reaction bar extending in parallel with said reaction spindle and extending axially beyond the machine part as said machine part is carried on said push-carrier.

13. Power tool according to claim 12, wherein said rotation motor forms a part of a standard type power wrench, and said housing is rigidly connected to said power wrench.

14. Power tool according to claim 1, wherein said rotation motor forms a part of a standard type power wrench, and said housing is rigidly connected to said power wrench.

15. Power tool according to claim 1, wherein said reaction spindle comprises a main central portion and a forward separate extension exchangeably attached to a forward end of said main central portion, said extension forms said threaded outer end portion.

* * * * *